(12) United States Patent
Howard

(10) Patent No.: US 9,854,286 B1
(45) Date of Patent: Dec. 26, 2017

(54) SYSTEMS AND METHODS FOR OPTIMIZING THE BROADCAST OF MULTIMEDIA

(75) Inventor: Michael L. Howard, Renton, WA (US)

(73) Assignee: Control4 Corporation, Salt Lake City, UT (US)

( * ) Notice: Subject to any disclaimer, the term of this patent is extended or adjusted under 35 U.S.C. 154(b) by 1434 days.

(21) Appl. No.: 12/099,703

(22) Filed: Apr. 8, 2008

(51) Int. Cl.
*H04N 21/258* (2011.01)

(52) U.S. Cl.
CPC .......................... *H04N 21/25891* (2013.01)

(58) Field of Classification Search
USPC ............................................. 725/34, 44, 69
See application file for complete search history.

(56) References Cited

U.S. PATENT DOCUMENTS

| | | | | | |
|---|---|---|---|---|---|
| 5,754,938 | A | * | 5/1998 | Herz | G06Q 20/383 348/E7.056 |
| 5,835,087 | A | * | 11/1998 | Herz | G06Q 20/383 348/E7.056 |
| 6,802,077 | B1 | * | 10/2004 | Schlarb | H04N 7/165 348/E5.006 |
| 2002/0042913 | A1 | * | 4/2002 | Ellis | H04N 7/163 725/34 |
| 2003/0038840 | A1 | * | 2/2003 | Stern | G06F 17/30899 715/760 |
| 2003/0089218 | A1 | * | 5/2003 | Gang | G06F 17/30743 84/615 |
| 2003/0208754 | A1 | * | 11/2003 | Sridhar | G06Q 30/02 725/34 |
| 2004/0073915 | A1 | * | 4/2004 | Dureau | G06Q 30/0251 725/9 |
| 2004/0268387 | A1 | * | 12/2004 | Wendling | H04N 5/4401 725/35 |
| 2008/0301737 | A1 | * | 12/2008 | Hjelmeland Almas | H04N 5/445 725/61 |

OTHER PUBLICATIONS

"Yahoo! Music LAUNCHcast," http://music.yahoo.com/launchcast/member.asp, May 7, 2008.
"Pandora Radio," http://pandora.com, May 7, 2008.

* cited by examiner

*Primary Examiner* — Nathan Flynn
*Assistant Examiner* — Christine Kurien
(74) *Attorney, Agent, or Firm* — Austin Rapp

(57) ABSTRACT

A method for optimizing the broadcast of multimedia is described. Multimedia is broadcast to at least one multimedia user device. User information is received from the at least one multimedia user device. The user information relates to user behavior from the at least one multimedia user device. The user information is processed to select future multimedia to broadcast. The future multimedia is broadcast.

24 Claims, 11 Drawing Sheets

SYSTEMS AND METHODS FOR OPTIMIZING THE BROADCAST OF MULTIMEDIA

TECHNICAL FIELD

The present disclosure relates generally to multimedia broadcast systems. More specifically, the present disclosure relates to systems and methods for optimizing the broadcast of multimedia.

BACKGROUND

Many types of multimedia are now available in a digital format, such as movies, music, and television programs. Consumers who wish to view or listen to multimedia may purchase physical copies of the multimedia, or they may license electronic copies of the multimedia. For example, compact discs (CDs) and digital versatile discs (DVDs) are now commonplace. Alternatively, consumers may purchase the right to have the multimedia broadcast to them by a broadcast system.

A broadcast system transmits multimedia to one or more recipients via a network. There are many different types of broadcast systems in operation today. For example, radio stations, cable stations, satellite systems and computer networks are all broadcast systems commonly used to transmit multimedia to users. Another more specific example is an Internet radio station that broadcasts audio to Internet users. An Internet radio station may simply be a simulcast of a traditional radio station. However, some Internet radio stations are completely independent from traditional radio stations and broadcast only on the Internet. The popularity of Internet radio and other broadcast systems is likely to continue to expand due to the increase in Internet connection speeds and the decrease in connection costs.

Digital multimedia may also be distributed to a consumer through a method commonly referred to as "streaming." Multimedia may be transmitted from a server to a client over one or more computer networks. The server may access the multimedia and send it to the client as a continuous data stream. Streaming multimedia is often sent in compressed form over the network. With streaming multimedia, multimedia users will typically not have to wait to download a large multimedia file before seeing and/or hearing the multimedia. The multimedia file is instead sent in a continuous stream and is played as it arrives.

Because the amount of multimedia available to consumers continues to increase, consumers may wish to listen to a particular song or watch a particular video before they initiate purchase of the song or video. In addition, multimedia distributors may desire to increase the purchase of specific multimedia. In view of the above, it may be desirable to have a multimedia broadcast system that will process observing and purchasing behavior to provide multimedia broadcasts in the future that uniquely appeal to users or consumers. Furthermore, multimedia distributors may desire a multimedia broadcast system that will allow them to optimize future broadcasts to increase multimedia sales.

DETAILED DESCRIPTION

Figure 1:
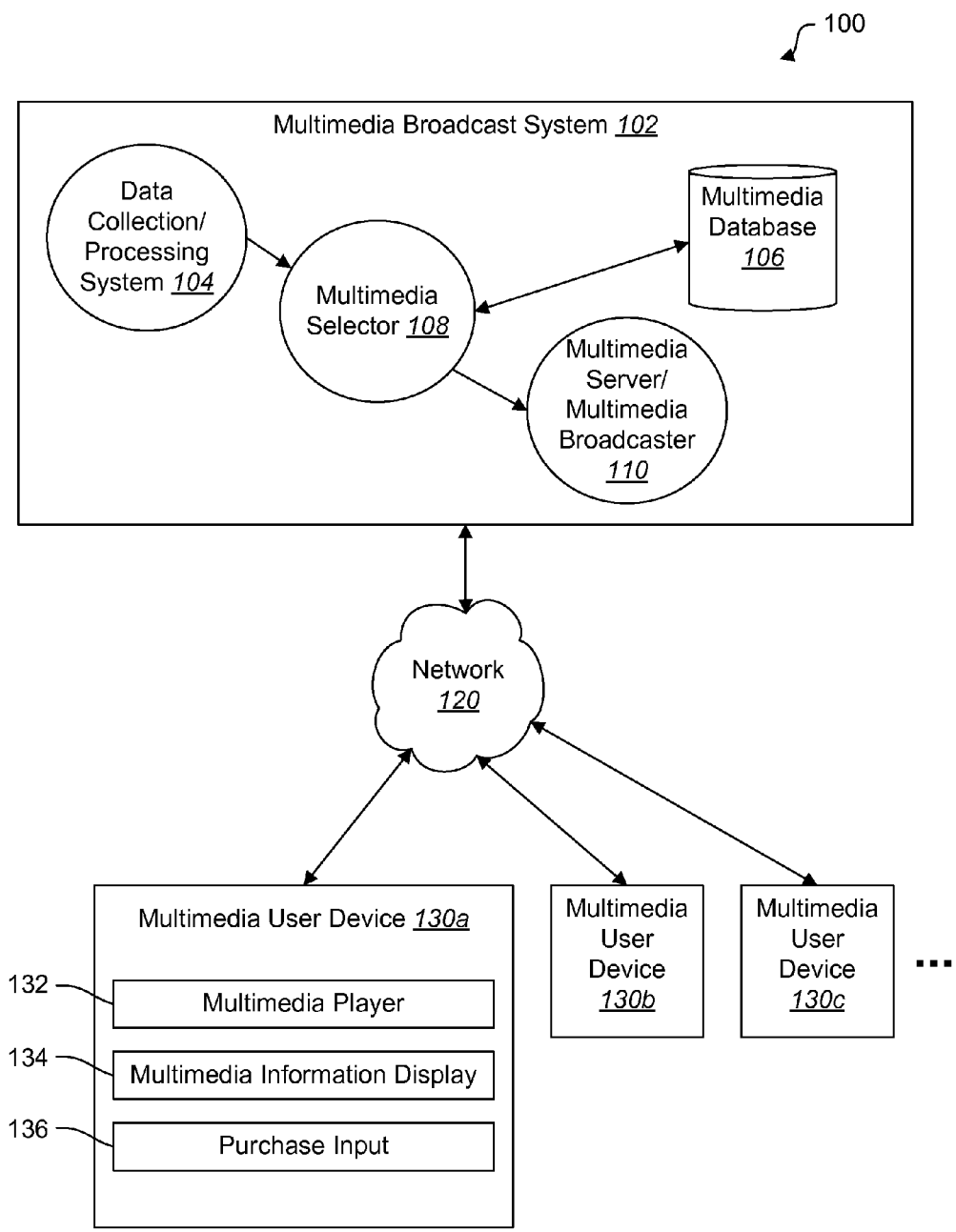
FIG. 1 is a block diagram illustrating an embodiment of a system for broadcasting optimized multimedia.

A method for optimizing the broadcast of multimedia is described. Multimedia is broadcast to at least one multimedia user device. User information is received from the at least one multimedia user device. The user information relates to user behavior from the at least one multimedia user device. The user information is processed to select future multimedia to broadcast. The future multimedia is broadcast.

The user information may include multimedia buying behavior and/or multimedia observing behavior. In one configuration, processing the user information to select future multimedia to broadcast may include processing the user information to select future multimedia to broadcast that will optimize multimedia sales. The multimedia sales may include sales that are initiated at a multimedia user device. In one configuration, the user information may indicate whether a purchase was initiated at the at least one multimedia user device.

The multimedia may include audio and/or video. The multimedia may be broadcast to a plurality of multimedia user devices, and the user information may be received from the plurality of multimedia user devices. The multimedia may be broadcast using radio broadcasts, Internet radio broadcasts, Internet TV, and/or RSS feeds.

A system configured to optimize the broadcast of multimedia is also described. The system includes a processor and memory in electronic communication with the processor. A multimedia database is in electronic communication with the processor. Instructions are stored in the memory. Multimedia is broadcast to at least one multimedia user device. User information is received from the at least one multimedia user device. The user information relates to user behavior from the at least one multimedia user device. The user information is processed to select future multimedia to broadcast. The future multimedia is broadcast.

A system configured to determine audio selections to broadcast in order to optimize sales of audio items is also described. The system includes an audio broadcast system and a plurality of multimedia user devices. The audio broadcast system includes an audio database, a data collection/processing component that is programmed to collect user information and determine audio selections to broadcast in order optimize sales of audio items based on the user information, and an audio server. Each multimedia user device includes a processor and memory in electronic communication with the processor. Instructions are stored in the memory and are executable to play audio on the multimedia user device. Each multimedia user device may also include a purchase input in electronic communication with the processor. The instructions may be further executable to send device user information to the audio broadcast system from the multimedia user device. The device user information may relate to user behavior at the multimedia user device.

A method for optimizing the broadcast of multimedia is also described. Multimedia is broadcast to at least one multimedia user device. User information is received. The user information includes user buying behavior. The user information is processed to select future multimedia to broadcast. The future multimedia is broadcast.

Several exemplary embodiments are now described with reference to the Figures. This detailed description of several exemplary embodiments, as illustrated in the Figures, is not intended to limit the scope of the claims.

The word "exemplary" is used exclusively herein to mean "serving as an example, instance or illustration." Any embodiment described as "exemplary" is not necessarily to be construed as preferred or advantageous over other embodiments.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments," unless expressly specified otherwise.

The term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

FIG. 1 is a block diagram illustrating an embodiment of a system 100 for broadcasting optimized multimedia. A multimedia broadcast system 102 may include a multimedia database 106. The multimedia database 106 may include multimedia files that can be broadcast over a network 120. The multimedia files in the multimedia database 106 may include audio and/or video files.

The multimedia broadcast system 102 may include a data collection/processing system 104. The data collection/processing system 104 may receive data from at least one multimedia user device 130. The data received may comprise information about the purchasing behavior of an at least one multimedia user and/or it may comprise information about the observing behavior of the at least one multimedia user. Examples of observing behavior may include listening behavior or viewing behavior. The data collection/processing system 104 may process the data received. Depending on the data received from the at least one multimedia user device 130, the data collection/processing system 104 may assign a weight to a broadcast audio file. The use of a weight is discussed below in relation to FIG. 4.

The data collection/processing system 104 may receive data for processing from a different device than the one a user is using to listen or view multimedia. For example, a user may use a first multimedia user device 130a to view or listen to multimedia (e.g., on an MP3 player), but the user may use a different device to make purchases (e.g., on a second multimedia user device 130b, on a desktop computer, etc.). In this scenario, the purchasing behavior may be received from a device that is different than the one being used to play the multimedia.

The multimedia broadcast system 102 may include a multimedia selector 108. The multimedia selector 108 may be in electronic communication with the multimedia database 106. The multimedia selector 108 may select multimedia from the multimedia database 106 for future multimedia broadcasts. The multimedia selector 108 may be in electronic communication with the data collection/processing system 104. The multimedia selector 108 may receive information from the data collection/processing system 104 comprising weights assigned to multimedia files. The multimedia selector 108 may determine a future multimedia broadcast from the multimedia database 106 according to the information received from the data collection/processing system 104. The multimedia selector 108 may select a future broadcast multimedia that will optimize multimedia sales.

Optimizing sales generally means to somehow make the sales better. Examples of optimizing sales include, but are not limited to, the following: getting more buyers, increasing repeat buyers, decreasing the time between release of new music and the purchase of the new music, achieving the best balance between the listener population and purchase revenue, increasing revenue generally, increasing revenue per listener, increasing revenue per purchaser, etc.

The multimedia broadcast system 102 may include a multimedia server/multimedia broadcaster 110. The multimedia server/multimedia broadcaster 110 may transmit the multimedia from the multimedia database 106 across the network 120.

The multimedia broadcast system 102 may be in electronic communication through a network 120 with at least one multimedia user device 130. In one embodiment, the multimedia user device 130 may be an audio device. Audio devices may include, but are not limited to, AM/FM radio receivers, XM radio receivers, computers, computing devices, CD players, MP3 players, cassette tape players, and other devices capable of producing an audio signal. In another embodiment, the multimedia user device 130 may be a video device. Video devices may include, but are not limited to, televisions, monitors, projectors, computers, computing devices, cable boxes, DVD players, DVRs (Digital Video Recorders) and other devices capable of producing a video signal.

The multimedia broadcast system 102 may transmit multimedia to one or more multimedia user devices 130a, 130b, 130c through the network 120. A network 120 is any network capable of sending multimedia from a source to a destination. Examples of networks 120 include, but are not limited to, radio broadcasts, cable networks, satellite networks, computer networks including Internet radio, Internet television (TV), RSS feeds, and other wireless or wired networks.

A multimedia user device 130a may include a multimedia player 132 that allows a multimedia user to play the transmitted multimedia. The multimedia user device 130a may also include a multimedia information display 134 that displays information or metadata about the transmitted multimedia to the multimedia user. A multimedia user device 130a may also include a purchase input 136. A purchase input 136 may allow the multimedia user to purchase the transmitted multimedia.

Figure 2:
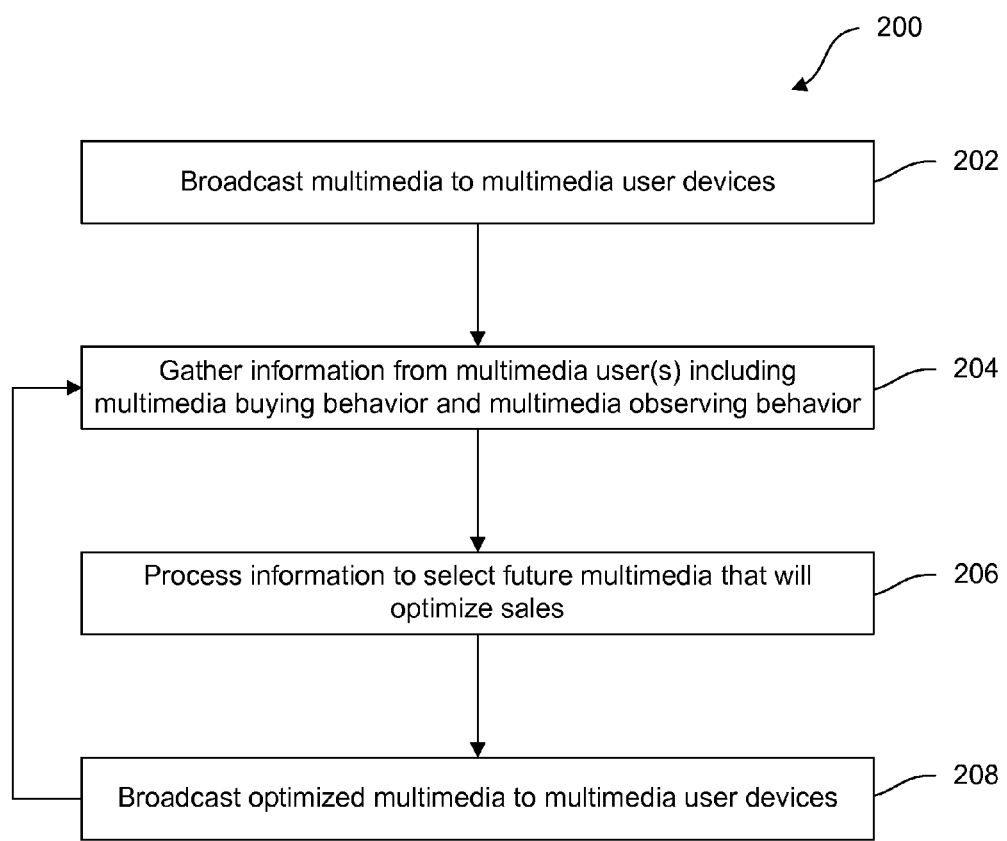
FIG. 2 is a flow diagram of an embodiment of a method for broadcasting optimized multimedia to one or more multimedia user devices.

FIG. 2 is a flow diagram of an embodiment of a method 200 for broadcasting optimized multimedia to one or more multimedia user devices 130. The multimedia broadcast system 102 may broadcast 202 multimedia to at least one multimedia user device 130. The multimedia broadcast system 102 may gather 204 information from one or more multimedia user devices 130. The gathered information may include the multimedia buying behavior and/or the multimedia observing behavior. The multimedia buying behavior and/or the multimedia observing behavior may be gathered from the same device or from different devices. In one embodiment, the multimedia buying behavior and/or the multimedia observing behavior may be gathered from the same device. In another embodiment, the multimedia buying behavior and/or the multimedia observing behavior may be gathered from different devices. This other embodiment realizes that users may, by way of example, listen to audio files on one device but purchase audio files on a different device.

The multimedia broadcast system 102 may process 206 the gathered information to select future multimedia that will optimize multimedia sales. The multimedia broadcast system 102 may broadcast 208 the optimized multimedia to one or more multimedia user devices 130.

Figure 3:
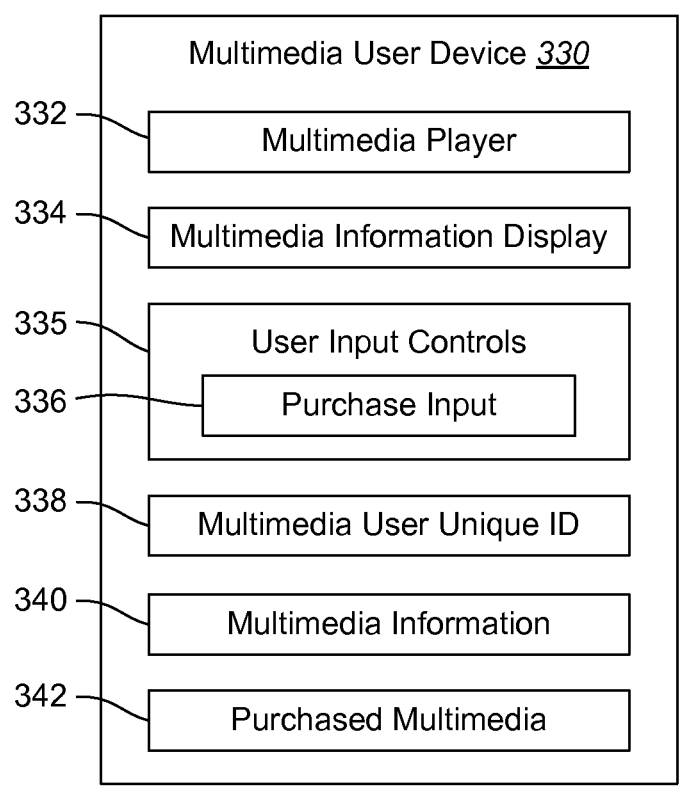
FIG. 3 is a block diagram illustrating various components that may be used in an embodiment of a multimedia user device in a system for broadcasting multimedia.

FIG. 3 is a block diagram illustrating various components that may be used in an embodiment of a multimedia user device 330 in a system for broadcasting multimedia. The multimedia user device 330 may include a multimedia player 332 for playing the multimedia to a multimedia user. The multimedia player 332 is any piece of hardware or software capable of playing the multimedia that was broadcast. The multimedia user device 330 may include a multimedia information display 334. The multimedia information display 334 may display information or metadata about a particular multimedia file or stream to a multimedia user. The multimedia information display 334 may be an LCD, a window on the desktop of a computing device, a popup on a television screen, an audio alert or other suitable display capable of displaying information about a particular multimedia file to a multimedia user.

The multimedia user device 330 may include user input controls 335. The user input controls 335 may allow a user to manipulate a multimedia file. For example, the user input controls 335 may facilitate a multimedia user increasing or decreasing the volume, skipping the current multimedia file, or scrolling through the metadata displayed on the multimedia information display 334. The user input controls 335 may be in the form of buttons, knobs, voice activated commands or the like. The user input controls 335 may include a purchase input 336. The purchase input 336 may facilitate the purchase of a multimedia file by the multimedia user. The purchase input 336 may be on a remote control unit, a home stereo device, a car stereo device, a television device, or the like. Alternatively, the purchase input 336 may be located on any device in the home or on a mobile telephone device. The purchase input 336 may also be a graphical user interface (GUI) that appears on a computer monitor or television screen.

The multimedia user device 330 may include a multimedia user unique ID 338. The multimedia user unique ID 338 may include information about the multimedia user. The multimedia user unique ID 338 may identify the multimedia user device to the multimedia broadcast system 102.

The multimedia user device 330 may include multimedia information 340 or metadata. The multimedia user device 330 may receive the multimedia information 340 or metadata about a multimedia file from the multimedia broadcast system 102 before playback of the multimedia file. Alternatively, the multimedia user device 330 may receive the multimedia information 340 about a multimedia file from the multimedia broadcast system 102 during playback of the multimedia file. Alternatively still, the multimedia user device 330 may not receive the multimedia information 340 about the multimedia file until after playback of the multimedia file has finished. The multimedia user device 330 may also include purchased or licensed multimedia files 342. The purchased or licensed multimedia files 342 may be stored in memory on the multimedia user device 330. Alternatively, the purchased multimedia files 342 may be stored on a remote storage device such as a flash memory card, floppy disk, CD, DVD, or other multimedia storage device.

Figure 4:
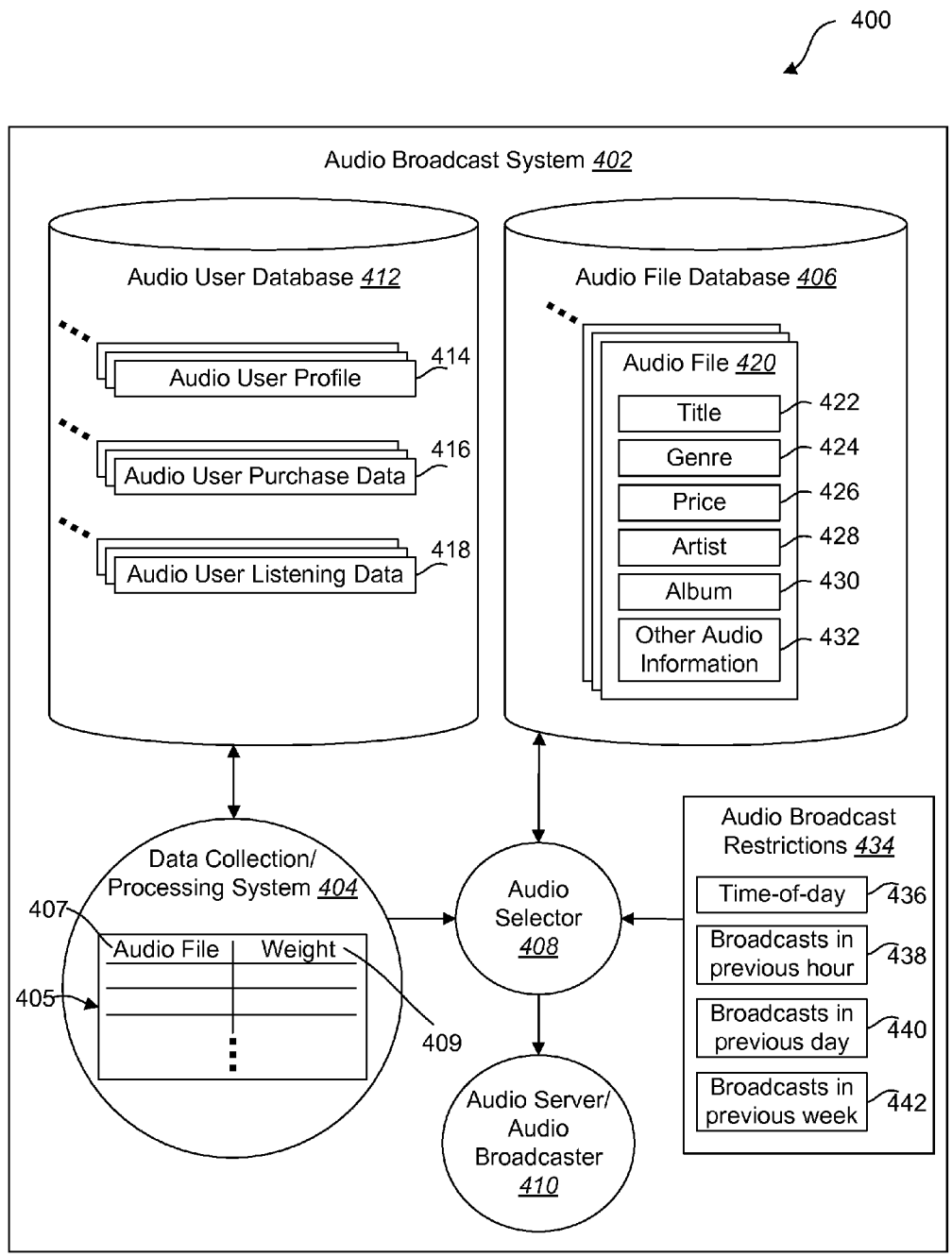
FIG. 4 is a block diagram illustrating various components that may be used in an embodiment of an audio broadcast system.

FIG. 4 is a block diagram illustrating various components that may be used in an embodiment of an audio broadcast system 402 in a system 400 for broadcasting primarily audio. The audio broadcast system 402 may include an audio user database 412. The audio user database 412 may include information about at least one audio user. For example, the audio user database 412 may include one or more audio user profiles 414. An audio user profile 414 may include information about an audio user. An audio user profile 414 may include an audio user's audio preferences, purchasing information such as credit card and payment status, location, age, and other relevant audio user data. The audio user profile 414 may enable the audio broadcast system 402 to automatically bill an audio user for content that the audio user has purchased or licensed.

The audio user database 412 may include audio user purchase data 416. The audio user purchase data 416 may include information about audio that has been previously purchased by the audio user. The audio user purchase data 416 may also include information concerning purchase practices of the audio user. These purchasing practices may include times of the day when audio is purchased, days of the week when audio is purchased, genres of audio purchased, and the like.

The audio user database 412 may include audio user listening data 418. The audio user listening data 418 may include information about audio files that have been listened to by the audio user. The audio user listening data 418 may also include information about audio files that the audio user has not listened to. For example, the audio user listening data 418 may include information about which audio titles the audio user has skipped over. As another example, the audio user listening data 418 may include information about which audio titles the audio user has not yet had a chance to listen to.

The audio broadcast system 402 may include an audio file database 406. The audio file database 406 may include at least one audio file 420. In some embodiments, the audio file database 406 includes many audio files 420. Besides the audio, an audio file 420 may include additional audio information or metadata about the audio file. For example, the metadata of an audio file 420 may include information such as the title 422, the genre 424, the price 426, the artist 428, and the album 430. The audio file 420 may also include other audio information 432 such as recorded bit rate, audio time length, and other audio information 432 that might be useful to or necessary for the audio user.

The audio broadcast system 402 may include a data collection/processing system 404. The data collection/processing system 404 may collect data from at least one audio user. The data collection/processing system 404 may process the collected data. For example, the data collection/processing system 404 may assign a weight to an audio file 420 according to the collected data. The data collection/processing system 404 may assign a higher weight to a more popular audio file 420 or to a new audio file 420. The data collection/processing system 404 may include a table 405 listing audio file titles 407 and their respective assigned weights 409.

The audio broadcast system 402 may include audio broadcast restrictions 434. The audio broadcast restrictions 434 may include constraints to limit the broadcast of audio files 420. For example, the audio broadcast restrictions 434 may include a time-of-day restriction 436 that constrains the broadcast of the audio file 420 depending on the time-of-day. Thus, certain audio files 420 may be constrained from being broadcast during certain times of the day. The audio broadcast restrictions 434 may include a previous hour restriction 438, a previous day restriction 440 and a previous week restriction 442 for an audio file 420 that constrain the broadcast of the audio file 420 depending on the number of broadcasts of the audio file 420 in the previous hour, the number of broadcasts of the audio file 420 in the previous day, or the number of broadcasts of the audio file 420 in the previous week. Thus, as an example, if an audio file 420 has been broadcast within the last hour, the audio broadcast restriction 434 may prevent the audio file 420 from being broadcast.

The audio broadcast system 402 may include an audio selector 408. The audio selector 408 may select an audio file 420 for immediate broadcast. Alternatively, the audio selector 408 may determine which audio files 420 are to be broadcast in the future. The audio selector 408 may select audio files 420 for broadcast from the audio file database 406. The audio selector 408 may use the data collection/processing system table 405 listing audio files 420 and their respective weights to select future broadcast audio files 420. The audio selector 408 may use the audio broadcast restrictions 434 to constrain the selected future broadcast of audio files 420.

The audio broadcast system 402 may include an audio server/audio broadcaster 410. The audio server/audio broadcaster 410 may transmit the audio files 420 selected for broadcast to the audio user(s).

Figure 5:
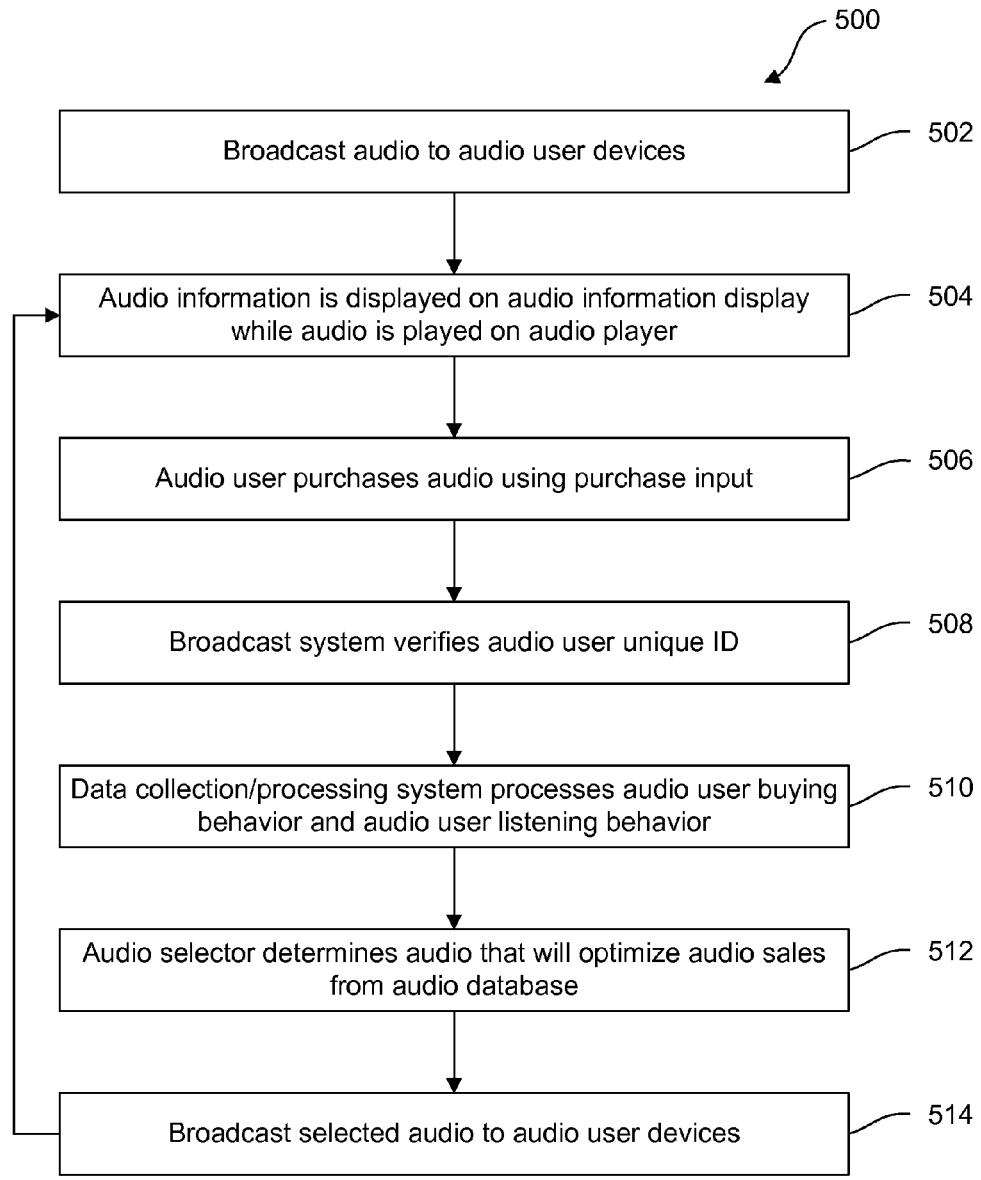
FIG. 5 is a flow diagram of an embodiment of a method for broadcasting optimized audio to one or more audio user devices.

FIG. 5 is a flow diagram of an embodiment of a method 500 for optimizing the broadcast of audio files 420 to audio user devices. An audio broadcast system 402 may broadcast 502 audio or an audio file 420 to audio user devices from an audio database 406. The audio user devices may display 504 audio information on an audio information display while the audio file 420 is played on an audio user device. An audio user may purchase (or license) 506 the audio file 420 using a purchase input on the audio user device. In response, the audio broadcast system 402 may verify 508 the audio user unique ID before transmitting the purchased audio file 420. A data collection/processing system 404 may process 510 the audio user buying and listening behavior. An audio selector 408 may determine 512 the audio to broadcast that will optimize sales. The audio broadcast system 402 may then broadcast 514 the selected audio files 420 to audio user devices.

Figure 6:
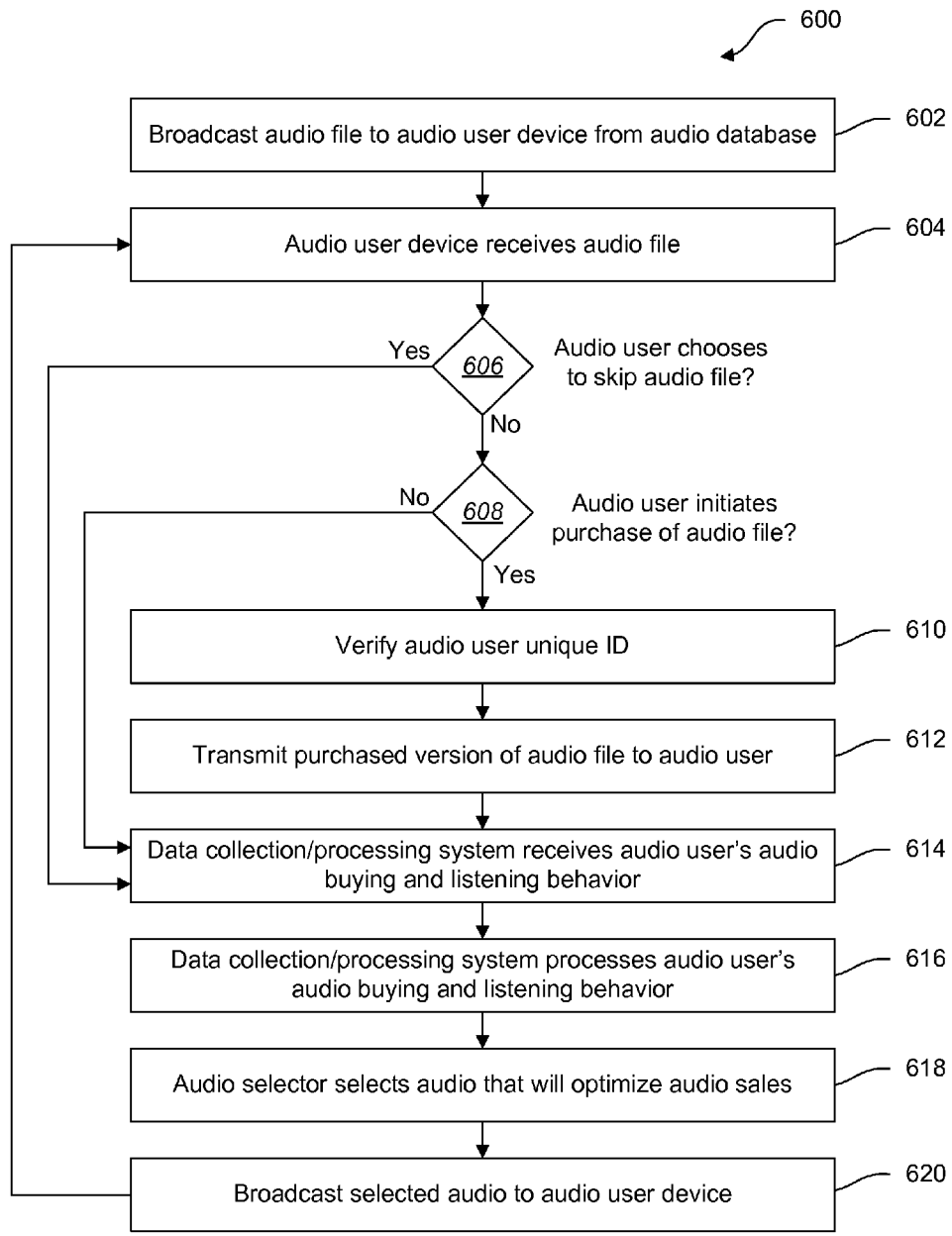
FIG. 6 is a flow diagram of an embodiment of a method for broadcasting optimized audio to an audio user device.

FIG. 6 is a flow diagram of an embodiment of a method 600 for optimizing the broadcast of audio files 420 to an audio user device. An audio broadcast system 402 may broadcast 602 audio from an audio file 420 to the audio user device from an audio database 406. The audio user device may receive 604 the audio. An audio user may choose 606 whether to skip playback of the current audio file 420. If the audio user chooses to skip playback of the current audio file 420, information including the audio user's choice to skip playback may be transmitted to the audio broadcast system 402. If the audio user does not choose to skip playback, playback of the audio file 420 may continue. The audio user may then initiate 608 purchase of the audio file 420. If the audio user does not initiate purchase of the audio file 420, information including the audio user's choice to not purchase the audio file 420 may be transmitted to the audio broadcast system 402. In response to the audio user initiating purchase of the audio file 420, the audio broadcast system 402 may verify 610 the audio user unique ID. The audio broadcast system 402 may then transmit 612 a purchased version or license code of the audio file 420 to the audio user device.

The data collection/processing system 404 may receive 614 information from the audio user including the audio user's audio buying and listening behavior. The data collection/processing system 404 may then process 616 the audio user's audio buying and listening behavior. The processing of the audio user's audio buying behavior and listening behavior may include assigning a weight to an audio file 420 in a data collection/processing system table 405. The weight assigned to an audio file 420 may be used to determine future broadcasts of the audio file 420. Alternatively, the processing of the audio user's audio buying and listening behavior may include the use of an algorithm to determine future audio broadcasts. For example, the algorithm may take into account the frequency an audio file 420 is played and the likelihood that an audio user will purchase it when determining future audio broadcasts.

The algorithm may depend on the style of music that the audio user is listening to. For example, the algorithm may strategically determine future audio broadcasts to match the style of music that an audio user has listened to or purchased. The algorithm may also attempt to alter the style of music to optimize future audio file 420 purchases. An audio selector 408 on the audio broadcast system 402 may select 618 audio for future audio broadcasting. The audio selector 408 may select an audio file 420 for immediate broadcast by the audio server/audio broadcaster 410 or the audio selector 408 may select a series of audio files 420 for future broadcasts by placing audio files 420 into a queue. The audio selector 408 may select 618 audio for future broadcasts that will optimize audio sales. The audio server/audio broadcaster 410 may then broadcast 620 the selected audio to the audio user device.

Figure 7:
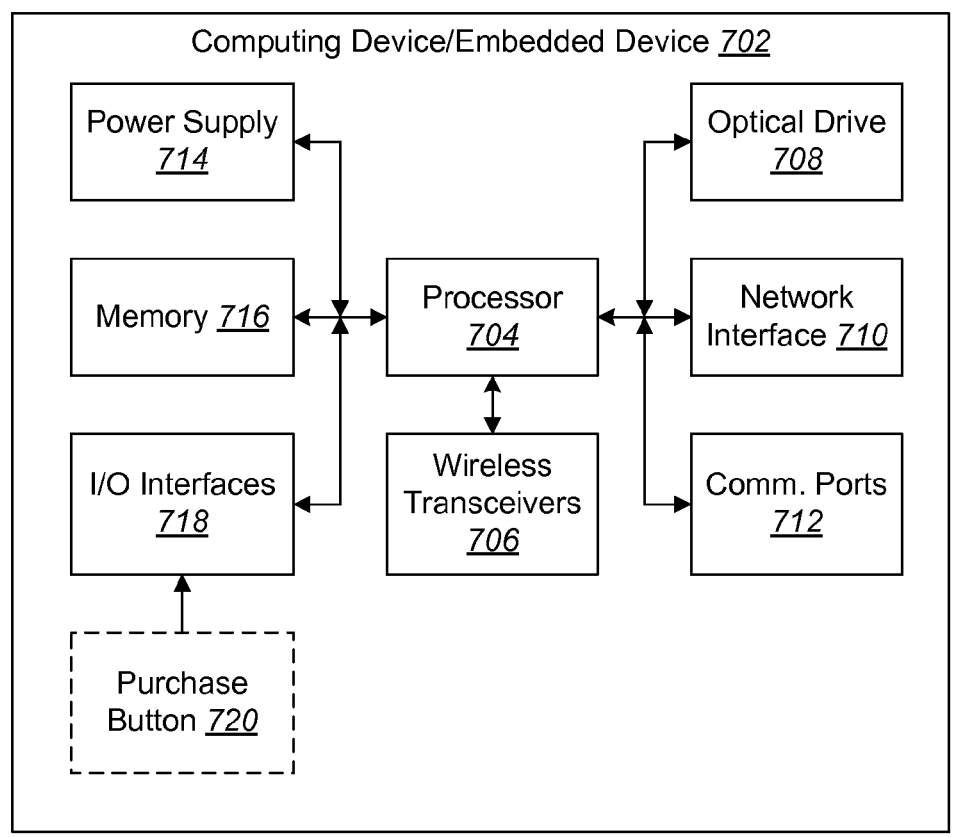
FIG. 7 is a block diagram illustrating various hardware components that may be used in an embodiment of a computing device or an embedded device.

FIG. 7 is a block diagram illustrating various hardware components that may be used in an embodiment of a computing device and/or an embedded device 702. Various components in the present systems and methods may be implemented by one or more computing devices and/or embedded devices 702 including, but not limited to, the multimedia broadcast system 102 and the multimedia user device 130. The device 702 may include a processor 704 that is in electronic communication with memory 716.

The processor 704 controls the operation of the device 702 and may be embodied as a microprocessor, a microcontroller, a digital signal processor (DSP), state machine, etc. In addition, the processor 704 may be implemented as a combination of discrete components, a combination of a DSP and a microprocessor, a plurality of microprocessors, one or more microprocessors in conjunction with a DSP core, or any other such configuration.

The processor 704 may perform logical and arithmetic operations based on program instructions, or logical definitions, stored within the memory 716 or circuits contained within the processor 704. The memory 716 may include volatile and/or non-volatile memory. The memory 716 may include any electronic component capable of storing electronic information, and may be embodied as read only memory (ROM), random access memory (RAM), magnetic disk storage media, optical storage media, flash memory devices in RAM, on-board memory included with the processor 806, EPROM memory, EEPROM memory, registers, hard disk, a removable disk, a CD-ROM, etc. The memory 716 may store program instructions and other types of data. The program instructions may be executed by the processor 704 to implement some or all of the methods disclosed herein.

The device 702 may include a power supply 714. The device 702 may include an optical drive 708. Examples of optical drives 708 include a CD-ROM drive, a CD-RW drive, a DVD-RW drive, a DVD-ROM drive, a Blu-ray drive, an HD-DVD drive, etc. The device 702 may be capable of using the optical drive 708 to rip audio or video data from CDs and DVDs, such as when the device 702 is embodied as a multimedia user device 130.

The device 702 may include a network interface 710 that allows the device 702 to communicate with other devices or networks using wired connections, such as Ethernet connections. The network interface 710 may use various protocols to enable the device 702 to interface with any wired network. The device 702 may include wireless transceivers 706 for communicating with other devices or networks using wireless connections. The device 702 may include any type of wireless transceiver 706. For instance, the wireless transceiver 706 may allow the device 702 to transmit and receive data using any wireless protocol, such as WiFi, ZigBee, Bluetooth, Ultra Wideband, Wimax, WirelessHD, and/or cellular protocols, such as GSM or EVDO.

The device 702 may include I/O interfaces 718. For example, the I/O interfaces 718 may include inputs and/or outputs such as buttons, selection dials, serial ports, contact ports, relay ports, IR windows, IR ports, video sense loop ports, audio ports, and video ports. In an embodiment of a multimedia user device 130, the I/O interfaces 718 may include a purchase input such as a purchase button 720.

The device 702 may include communication ports 712. The communication ports 712 may include USB ports, firewire ports, or other ports for communicating with other devices.

Some devices 702 may not include all of the illustrated components. For example, many multimedia user devices 130 may not include an optical drive 708. Other devices 702 may include additional components.

Figure 8:
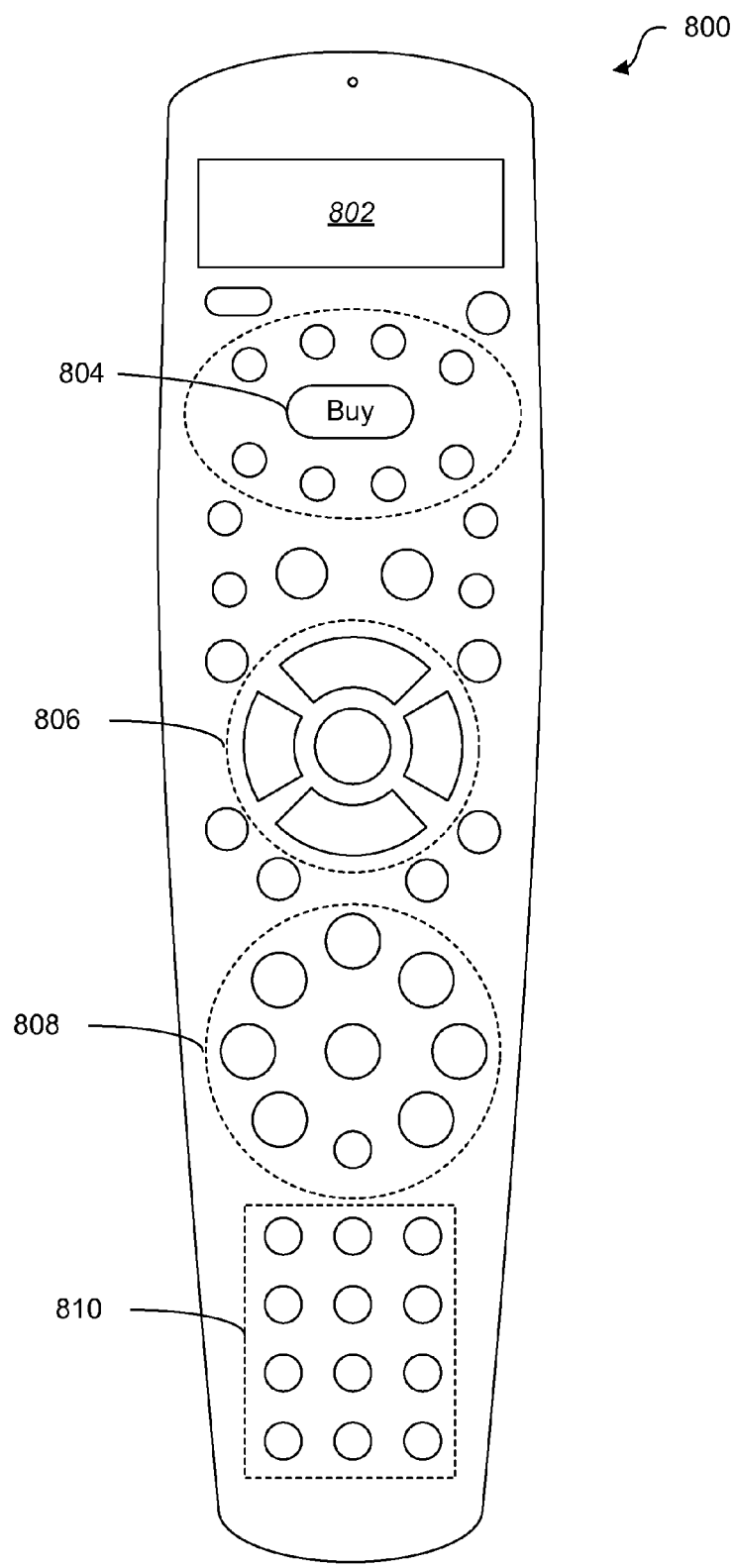
FIG. 8 illustrates one embodiment of a multimedia user device.

FIG. 8 is a block diagram illustrating the various features available in one possible embodiment of a multimedia user device remote control 800. The multimedia user device remote control 800 may be in electronic communication with a multimedia user device 130. For example, the multimedia user device remote control 800 may transmit commands to the multimedia user device 130 via infrared (IR), radio frequency (RF), a wireless connection using the 802.11g (WiFi) standard, a wireless connection using the 802.15.4 (ZigBee) standard, an Ethernet connection, and/or other wired or wireless connections.

The multimedia user device remote control 800 may include a display area 802. The display area 802 may be a backlit LCD screen. In some embodiments, the display area 802 may be a simple LCD screen such that the LCD screen has limited capacity to display information. The display area 802 may display information or metadata for the current multimedia file. The display area 802 may display the multimedia title, artist, price, and other information that may be useful and/or necessary to a multimedia user. Alternatively, the display area 802 may display metadata for future multimedia files.

The multimedia user device remote control 800 may include a microphone, an audio in port, a speaker, or the like. The multimedia user device remote control 800 may include various I/O interfaces. The I/O interfaces may include buttons or controls for user input. For example, the multimedia user device remote control 800 may include activity selection buttons 808, navigation controls 806, device control inputs, input controls 810, and/or other I/O interfaces.

The multimedia user device remote control 800 may include a buy button 804. The buy button 804 may allow the multimedia user to initiate purchase of multimedia files from the multimedia user device remote control 800. Alternatively, the buy button 804 may allow the multimedia user to initiate purchase of an audio file as part of a soundtrack to a movie or television show.

The activity selection buttons 808 may allow the user to select which devices to control. For example, the activity selection buttons 808 may include buttons that allow the user to control televisions, video recording/playback devices, audio recording/playback devices, and/or other devices.

The navigation controls may include navigation buttons 806 that allow a user to navigate through user interfaces. For example, navigation buttons 806 may allow the user to select various options presented in the display area 802.

The input controls 810 may include numeric, alphanumeric, or other arrangements of input buttons. The input controls 810 may allow a user to input alphanumeric characters. For example, in the present embodiment, the input controls 810 may be numeric buttons such as the numbers 0-9 that may also be used to input text using various systems, such as Multi-Tap or T9, iTap, LetterWise, or other predictive text technology. The input controls may include a qwerty keyboard, thumbboard, or other layout.

The multimedia user device remote control 800 may include a wireless transceiver. The wireless transceiver may be used to send and receive wireless signals over a network.

Figure 9:
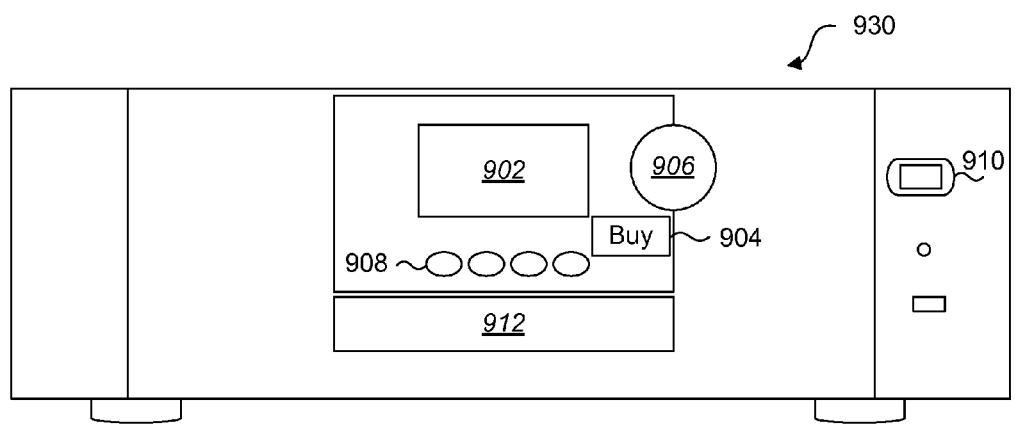
FIG. 9 is a front view illustrating another embodiment of a multimedia user device.

FIG. 9 is a front view illustrating another embodiment of a multimedia user device 930. Specifically, FIG. 9 shows the front of an exemplary home audio playback device 930 (e.g., a home stereo).

The home audio playback device 930 may include a display area 902. The display area 902 in the present embodiment may be used to display settings, playlist sections, title sections, media information, receiver status, and system menus. The home audio playback device 930 may also include various buttons 908 for selecting options displayed in the display area. The home audio playback device 930 may include a buy button 904 that allows the audio user to initiate purchase of an audio file 420. Alternatively, the buy button 904 may be located anywhere in the home that will allow the audio user to purchase an audio file 420.

The home audio playback device 930 may include an IR receiver 910. The IR receiver 910 may be used to receive IR codes from an audio playback device remote control 800 or from any other device capable of sending IR signals. The home audio playback device 930 may include a selection dial 906. The selection dial 906 may be used to scroll through menus, media lists, and media information displayed in the display area 902.

The home audio playback device 930 may also include an optical drive 912. As discussed above, the optical drive 912 may be one of any variety of drives capable of playing CD or DVD related media.

Figure 10:
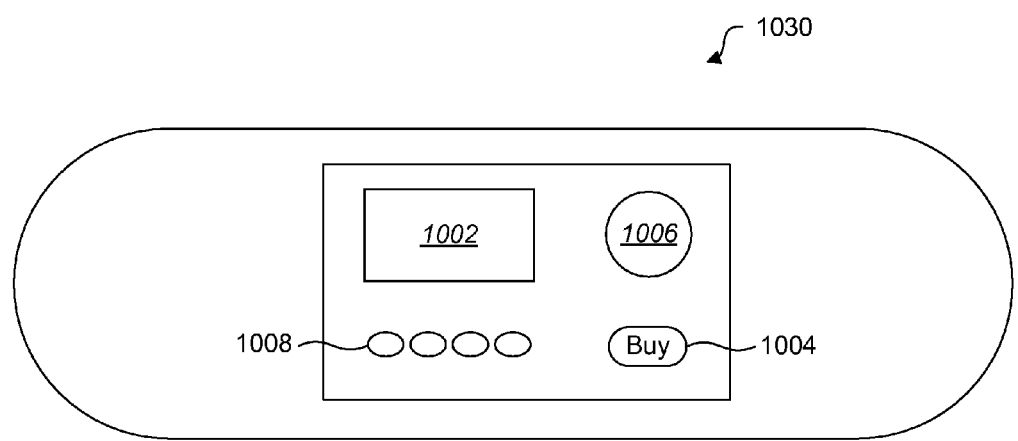
FIG. 10 is a front view illustrating a further embodiment of a multimedia user device.

FIG. 10 is a front view illustrating a further embodiment of a multimedia user device 1030. Specifically, FIG. 10 shows the front of an exemplary automobile audio playback device 1030.

The automobile audio playback device 1030 may include a display area 1002. The display area 1002 in the present embodiment may be used to display settings, playlist sections, title sections, media information, receiver status, and system menus. If the embodiment uses radio to receive audio, it may use the Radio Data System (RDS) to obtain information about the audio, such as the song, album, artist, and the like.

The automobile audio playback device 1030 may also include various buttons 1008 for selecting options displayed in the display area. The automobile audio playback device 1030 may include a buy button 1004 that allows the audio user to initiate purchase of an audio file 420.

Audio may be delivered to the automobile audio playback device 1030 whenever the automobile audio playback device 1030 is capable of receiving audio. For example, if the automobile audio playback device 1030 is within range of a radio station and if it 1030 has the ability to receive radio transmissions, the device 1030 may receive and play the audio from the radio stations it is capable of receiving. Additionally, the automobile audio playback device 1030 may receive streaming audio, and it may sync up with an audio broadcast system 402 and receive audio files 420 during select times. The automobile audio playback device 1030 may be in electronic communication with the audio broadcast system 402.

The automobile audio playback device 1030 may include an IR receiver. The IR receiver may be used to receive IR codes from an automobile audio playback device remote control 800 or from any other device capable of sending IR signals. The automobile audio playback device 1030 may include a selection dial 1006. The selection dial 1006 may be used to scroll through menus, media lists, and media information displayed in the display area 1002.

Figure 11:
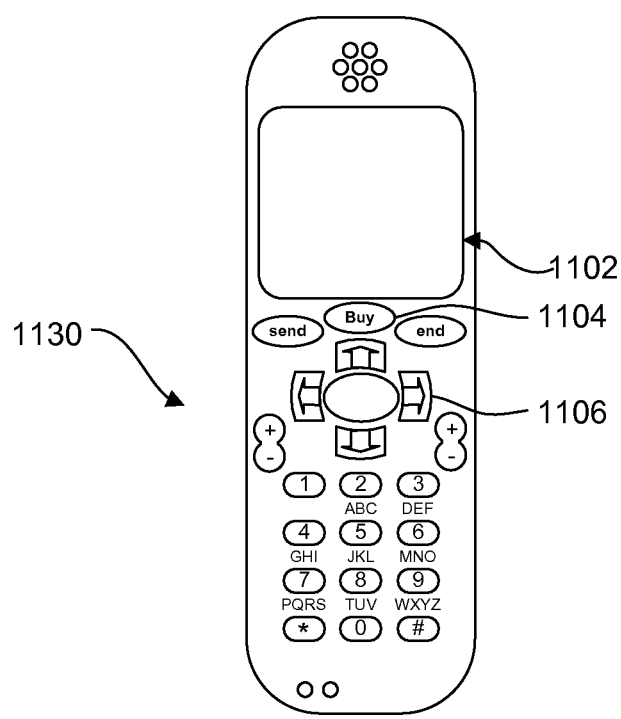
FIG. 11 illustrates another embodiment of a multimedia user device.

FIG. 11 illustrates another embodiment of a multimedia user device 1130. Specifically, FIG. 11 shows the front of an exemplary mobile communications device 1130.

The mobile device 1130 may include a display area 1102. The display area 1102 in the present embodiment may be used to display settings, playlist sections, title sections, media information, receiver status, and system menus. The mobile device 1130 may also include various buttons 1106 for selecting options displayed in the display area 1102. The mobile device 1130 may include a buy button 1104 that allows a multimedia user to initiate purchase of a multimedia file.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules, circuits and algorithm steps described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as limiting the scope of the claims.

The various illustrative logical blocks, modules and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

The steps of a method or algorithm described in connection with the embodiments disclosed herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

While specific embodiments have been illustrated and described, it is to be understood that the claims are not limited to the precise configuration and components illustrated above. Various modifications, changes and variations may be made in the arrangement, operation and details of the embodiments described above without departing from the scope of the claims.

What is claimed is:

1. A method for optimized broadcasting, comprising:
   broadcasting multimedia to a first multimedia user device and a second multimedia user device from a multimedia broadcast system;
   receiving user information by the multimedia broadcast system from the first multimedia user device and the second multimedia user device, wherein the user information received at the multimedia broadcast system from the first multimedia user device comprises an indication that a user skipped over a first multimedia file while using the first multimedia user device, wherein the multimedia broadcast system stores information identifying multimedia files that the user has not yet viewed or listened to, wherein the user information received at the multimedia broadcast system further comprises multimedia purchasing behavior for the user while using the second multimedia user device, wherein the second multimedia user device transmits to the multimedia broadcast system an indication that the user chose not to purchase a second multimedia file that has been broadcast to the second multimedia user device;
   processing the user information to select future multimedia to broadcast that will optimize multimedia sales; and
   broadcasting the future multimedia based on a broadcast restriction that restricts the broadcast of the future multimedia based on how recently the future multimedia was broadcast to the user.

2. The method of claim 1, wherein the multimedia sales comprise sales that are initiated at one of the multimedia user devices.

3. The method of claim 1, wherein the multimedia comprises audio.

4. The method of claim 1, wherein the multimedia comprises video.

5. The method of claim 1, wherein the multimedia purchasing behavior indicates whether a purchase was initiated at the second multimedia user device.

6. The method of claim 1, wherein the multimedia is broadcast using radio broadcasts.

7. The method of claim 1, wherein the multimedia is broadcast using Internet radio broadcasts.

8. The method of claim 1, wherein the multimedia is broadcast using Internet TV.

9. The method of claim 1, wherein the multimedia is broadcast using RSS feeds.

10. A system that is configured to optimize broadcasting, the system comprising:
    a processor;
    memory in electronic communication with the processor;
    a multimedia database in electronic communication with the processor;
    instructions stored in the memory, the instructions being executable to:
       broadcast multimedia to a first multimedia user device and a second multimedia user device;
       receive user information by the system from the first multimedia user device and the second multimedia user device, wherein the user information received at the system from the first multimedia user device comprises an indication that a user skipped over a first multimedia file while using the first multimedia user device, wherein the multimedia broadcast system stores information identifying multimedia files that the user has not yet viewed or listened to, wherein the user information received at the multimedia broadcast system further comprises multimedia purchasing behavior for the user while using the second multimedia user device, wherein the second multimedia user device transmits to the multimedia broadcast system an indication that the user chose not to purchase a second multimedia file that has been broadcast to the second multimedia user device;
       process the user information to select future multimedia to broadcast that will optimize multimedia sales; and
       broadcast the future multimedia based on a broadcast restriction that restricts the broadcast of the future multimedia based on how recently the future multimedia was broadcast to the user.

11. The system of claim 10, wherein the multimedia sales comprise sales that are initiated at one of the multimedia user devices.

12. The system of claim 10, wherein the multimedia comprises audio.

13. The system of claim 10, wherein the multimedia comprises video.

14. The system of claim 10, wherein the multimedia purchasing behavior indicates whether a purchase was initiated at the second multimedia user device.

15. The system of claim 10, wherein the multimedia is broadcast using radio broadcasts.

16. The system of claim 10, wherein the multimedia is broadcast using Internet radio broadcasts.

17. A system that is configured to determine audio selections to broadcast in order to optimize sales, the system comprising:
    an audio broadcast system comprising:
       an audio database;
       a data collection and processing component that is programmed to collect user information and determine the audio selections to broadcast in order to optimize sales based on the user information, wherein the user information received at the audio broadcast system from the first multimedia user device comprises an indication that a user skipped over a first multimedia file while using the first multimedia user device, wherein the multimedia broadcast system stores information identifying multimedia files that the user has not yet viewed or listened to, wherein the user information received at the multimedia broadcast system further comprises multimedia purchasing behavior for the user while using the second multimedia user device, wherein the second multimedia user device transmits to the multimedia broadcast system an indication that the user chose not to purchase a second multimedia file that has been broadcast to the second multimedia user device, and wherein the data collection and processing component of the audio broadcast system receives the user information; and
       an audio server that broadcasts the audio selections based on a broadcast restriction that restricts the broadcast of the audio selections based on how recently the audio selections were broadcast to the user;

a plurality of multimedia user devices that comprises at least the first multimedia user device and the second multimedia user device, wherein each multimedia user device comprises:
a processor;
memory in electronic communication with the processor; and
instructions stored in the memory, the instructions being executable to:
play audio on the multimedia user device.

18. The system of claim 17, wherein each multimedia user device further comprises a purchase input in electronic communication with the processor.

19. The system of claim 18, wherein the instructions are further executable to send device user information to the audio broadcast system from the multimedia user device.

20. The method of claim 1, wherein the broadcast restriction limits the broadcasting of the future multimedia based on at least one of a time-of-day restriction, a previous hour restriction, a previous day restriction and a previous week restriction.

21. The method of claim 20, wherein the multimedia comprises audio files.

22. The system of claim 17, wherein:
the audio database comprises a first audio file and a second audio file;
the collected user information comprises an indication that the first audio file is more popular than the second audio file; and
the data collection and processing component assigns a higher weight to the first audio file than to the second audio file based on the indication that the first audio file is more popular than the second audio file.

23. The system of claim 17, wherein at least one of the multimedia user devices receives commands from a multimedia user device remote control via infrared, wherein the multimedia user device remote control comprises a liquid crystal display (LCD) screen that displays the following metadata: title, artist and price of a multimedia file being played.

24. The method of claim 1, wherein at least one of the multimedia user devices receives commands from a multimedia user device remote control via a wireless connection according to Institute of Electrical and Electronics Engineers (IEEE) 802.15.4 standard.

\* \* \* \* \*